J. N. GRABER.
CULTIVATOR.
APPLICATION FILED AUG. 6, 1908.
1,009,506.
Patented Nov. 21, 1911.
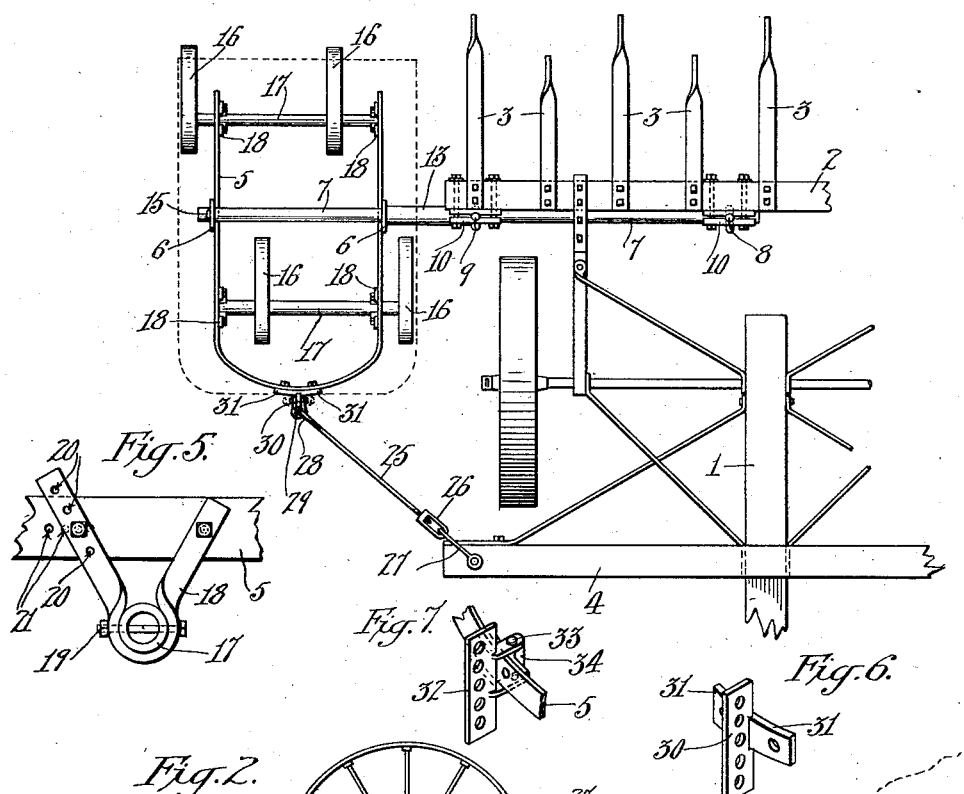
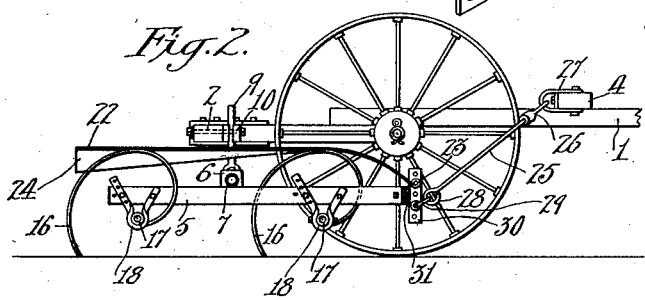
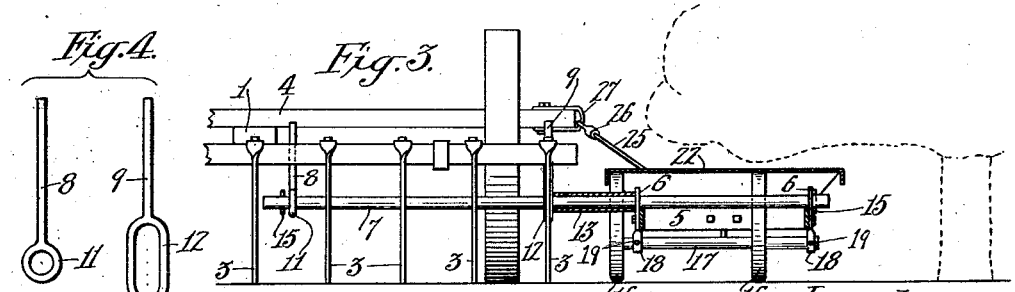
Witnesses:
Inventor:
John N. Graber;

UNITED STATES PATENT OFFICE.

JOHN N. GRABER, OF MINERAL POINT, WISCONSIN.

CULTIVATOR.

1,009,506.  Specification of Letters Patent.  Patented Nov. 21, 1911.

Application filed August 6, 1908. Serial No. 447,339.

*To all whom it may concern:*

Be it known that I, JOHN N. GRABER, a citizen of the United States, residing at Mineral Point, in the county of Iowa and State of Wisconsin, have invented a new and useful Cultivator, of which the following is a specification.

This invention relates to cultivators, and more particularly to attachments therefor by means of which the ground in otherwise inaccessible places can be stirred or cultivated, as under the projecting limbs of trees, &c., where the limbs come close to the ground and are loaded with fruit, as with orange trees.

In cultivating orange groves, which must be done frequently in the summer time where irrigation must be resorted to, the cultivator is drawn back and forth through the grove by means of suitable power and as close to the trees as possible without breaking the limbs or knocking off the fruit which. frequently hangs very close to the ground. In order to stir the ground underneath such limbs I have provided an attachment which can be secured to one or both sides of the cultivator in such position that it will extend in under the limbs, and I provide means for preventing the limbs from catching therein. I also provide means for placing the frame of the attachment lower than the main frame of the cultivator so as to avoid as much as possible its engaging with the limbs. I also provide means for adjusting the frame vertically while permitting it such freedom of movement vertically as will enable it to adapt itself to the varying position or condition of the earth. I also provide adjustable means for connecting the frame with the draft mechanism of the cultivator.

The accompanying drawings illustrate the invention and form part of the specification.

Figure 1 is a broken plan view of a cultivator provided with my attachment. Fig. 2 is a side elevation of the same. Fig. 3 is a rear view partly in section. Fig. 4 is a detail view of the hangers for connecting the attachment with the main frame of the cultivator. Fig. 5 is a broken detail view of the means for supporting and adjusting the teeth. Fig. 6 is a perspective view of the adjustable means for connecting the attachment with the draft mechanism of the cultivator. Fig. 7 is a perspective detail view of a different means for securing the draft appliances to the attachment.

Referring more particularly to the drawings which are for illustrative purposes only and, therefore, are not drawn to any particular scale, 1 indicates a cultivator which may be of any suitable size and construction so that it is provided with a cross bar 2 for the teeth 3 and a cross piece 4 for the draft mechanism.

The frame 5 of my attachment is preferably formed from a flat bar bent into substantial U shape and is provided intermediate its ends with vertically extending perforated ears 6, by means of which it is pivotally mounted upon a rod or bar 7 that has its inner end extended in underneath or adjacent to the cross piece 2 of the cultivator. Two hangers 8 and 9 are secured to the cultivator in any desired manner, clamps 10 being shown in the drawings. One of the hangers is provided with a circular eye 11 at its lower end, and the other one is provided with an elongated loop 12 through which the bar 7 projects when the attachment is in position. The hanger 9 with its loop 12 is preferably secured to the outer end of the bar 2 so as to permit the outer end of the bar and the cultivator attachment to have free vertical movement within the limits of the loop 12.

A sleeve 13 is mounted upon the bar 7 between the loop of the hanger 9 and the inner ear 6 so as to properly position the attachment relatively to the main frame of the cultivator, preferably with the inner tooth of the attachment at substantially the same distance from the outer tooth of the cultivator as the teeth of the cultivator are from each other. The bar 7 is held against longitudinal movement by suitable means, as pins 15 which pass through the bar on the outside of the outer ear and the inner side of the inner hanger as shown more particularly in Fig. 3. The pins could be located at other points, as upon the outside of the hanger and the ear at the opposite ends of the sleeve, and other means than pins could be used if desired.

The teeth 16 of the attachment are preferably adjustably connected with cross pieces 17 in any desired manner and the bars or cross pieces 17 are secured below the underside of the frame 5 by means of substantially V-shaped hangers 18. In the drawings I have shown the bar 17 as being hollow, preferably as a piece of pipe which is perforated at or adjacent its ends for the passage of a bolt 19 by means of which it is rigidly secured to two of the hangers 18. There are preferably two of these tooth bars, one near each end of the frame 5, and each having one end extending beyond the side of the frame and provided with a tooth on the outer end of said extension. The inner portion of each bar is provided with a tooth and said teeth are arranged relatively to each other in such position that they zigzag or alternate with each other whereby the earth is broken up at a distance beyond the sides of the attachment frame as well as between them. The teeth of the attachment are preferably flexible and are curved so as to extend above and to the rear of the tooth bars and they are thus peculiarly adapted for cultivating among the trees as they are not liable to be broken in case the point should catch upon the roots of the trees. The position of the points of the teeth can be adjusted or moved relatively to the earth by partially rotating the bar 17. This movement of the bar is preferably secured by providing the arms of the V-shaped hanger 18 with perforations 20, one arm being provided with a single perforation which is adapted to act as a pivot, while the other arm is provided with a series of perforations by means of which that end or arm can be swung up or down relatively to the frame 5 and be rigidly secured in its adjusted position by passing the connecting bolt through one of the perforations of said series and also through one of the holes 21 in the frame 5. The bridge portion between the arms of said hangers is bent to form a cradle in which the bars 17 are supported.

To prevent the limbs and fruit from being caught and torn off or broken by the teeth of the cultivator attachment a shield or guard 22 is preferably provided which is pivotally connected with the front end of the attachment in any suitable manner, as by means of a bar 23 to which the shield is pivotally connected. The shield is also preferably provided with depending wings or flanges 24 which are adapted to extend down below the tops of the teeth and thereby assist in holding the shield against lateral displacement and also to assist in preventing the engagement with the teeth of the fruit or limbs of the trees. The shield is adapted to be swung upward out of the way when it is necessary to have access to the attachment.

The attachment is adjustably connected with the draft mechanism 4 in any suitable manner, as by a rod 25 which is connected at its forward end to the cross piece 4 by a turn-buckle 26 and clevis 27. The rear end of the bar 25 is connected with the forward end of the frame by means of a ring 28 and a clevis 29 which is adjustably connected with a perforated bar 30 which is secured to the forward end of the frame in any suitable manner, as by the wings 31. Or a perforated bar 32 could be provided with rearwardly extending arms, through which a pin 33 is passed behind the front bar of the attachment. The pin is held against lateral movement by a strap that is secured by its ends to the frame and has a swell or bowed portion 34 for the reception of the pin.

By constructing a cultivator or cultivator attachment as above described the same can be quickly connected with or removed from an ordinary cultivator and so located relatively thereto that when the cultivator is drawn alongside of a tree the attachment will be forced in under the limbs and thereby it will be caused to stir or cultivate the ground under the limbs. It can be readily adjusted to adapt it for the proper cultivation of the ground and its pivotal connection with the main frame through the laterally extended bar and the perforated ears of the attachment frame mounted thereon in connection with the vertical movement permitted by the elongated eye or loop of the hanger will permit it to readily adapt itself to all the conditions of the soil that will be met with, and its connection with the draft mechanism of the cultivator will not materially interfere with or affect the operation of the main cultivator. The forward end of the shield over the teeth is located at such a point that it will readily pass in under the lowest limbs and gradually raise them and lift them above the teeth of the attachment until they pass off the rear end of the shield to the rear of the attachment.

Having described my invention, I claim:—

In an attachment for cultivators, a frame provided with upwardly curved teeth, and a shield extending over said frame and pivotally secured at its forward end to said frame, said shield having flanges adapted to engage the outer teeth on said frame.

In testimony whereof, I have hereunto set my hand at Janesville Wisconsin this 27" day of July 1908.

JOHN N. GRABER.

In presence of—
J. J. CUNNINGHAM,
GERTRUDE KOLLE.

---

Copies of this patent may be obtained for five cents each, by addressing the "Commissioner of Patents, Washington, D. C."